United States Patent [19]

Dobrowolski et al.

[11] Patent Number: 5,009,486
[45] Date of Patent: Apr. 23, 1991

[54] FORM DEPICTING, OPTICAL INTERFERENCE AUTHENTICATING DEVICE

[75] Inventors: Jerzy A. Dobrowolski, Ottawa; Fang C. Ho, Gloucester; Allan J. Waldorf, Kemptville, all of Canada

[73] Assignee: Canadian Patents and Development Limited/Societe Canadienne des Brevets et D'Exploitation Limitee, Ottawa, Canada

[21] Appl. No.: 327,542
[22] Filed: Mar. 23, 1989

Related U.S. Application Data

[63] Continuation-in-part of Ser. No. 741,562, Jun. 5, 1985.

[30] Foreign Application Priority Data

Jun. 8, 1984 [CA] Canada ............................... 456146

[51] Int. Cl.⁵ .................... G02B 1/10; G02B 27/00; B42D 15/00
[52] U.S. Cl. .................................. 350/164; 350/163; 283/91
[58] Field of Search ................... 350/162.17, 166, 163, 350/164; 283/91, 87, 85, 86, 94, 87, 114

[56] References Cited

U.S. PATENT DOCUMENTS 4,033,059  7/1977  Hutton et al. ..................... 283/91
4,307,899 12/1981  Hoppe ................................ 350/166

FOREIGN PATENT DOCUMENTS 73762  4/1976  Australia ........................... 156/277

OTHER PUBLICATIONS

Dobrowolski et al. "Optical Interference Coatings for Inhibiting Counterfeiting" *Optica Acta*, 1973, vol. 20, No. 12, pp. 925-927.

Primary Examiner—Bruce Y. Arnold
Assistant Examiner—James Phan
Attorney, Agent, or Firm—Griffin, Branigan & Butler

[57] ABSTRACT

A hard to simulate, readily distinguishable from counterfeits, optical interference authenticating device comprises a substrate, and two optical interference coatings in interfacial contact on one side of the substrate, one of the optical interference coatings being a contrast coating, the other of the optical interference coatings being a form depicting coating for depicting a form relative to the contrast coating. The optical interference coatings each comprising at least one optical interference layer the material and thickness of which has been selected for the coatings to have different, particular, known spectral reflectance and spectral transmittance characteristics from one another when viewed at a particular angle, such that the form depicting coating is visible by reflected or transmitted light of particular coloration, when viewed at the particular angle, at least in part by optical interference of light partically reflected or transmitted at the interfacial contact. A further optical interference contrast coating may be provided on the substrate and the form depicting coating may be sandwiched between the contrast coatings. The substrate may be transparent, semi-transparent or opaque, depending how the spectral characteristics are to be observed. A marginal edge portion of the form depicting coating may taper in thickness to provide a multicolored auriole around the form. A plurality form depicting coatings may be provided which overlie one another to provide a more complex pattern.

13 Claims, 2 Drawing Sheets

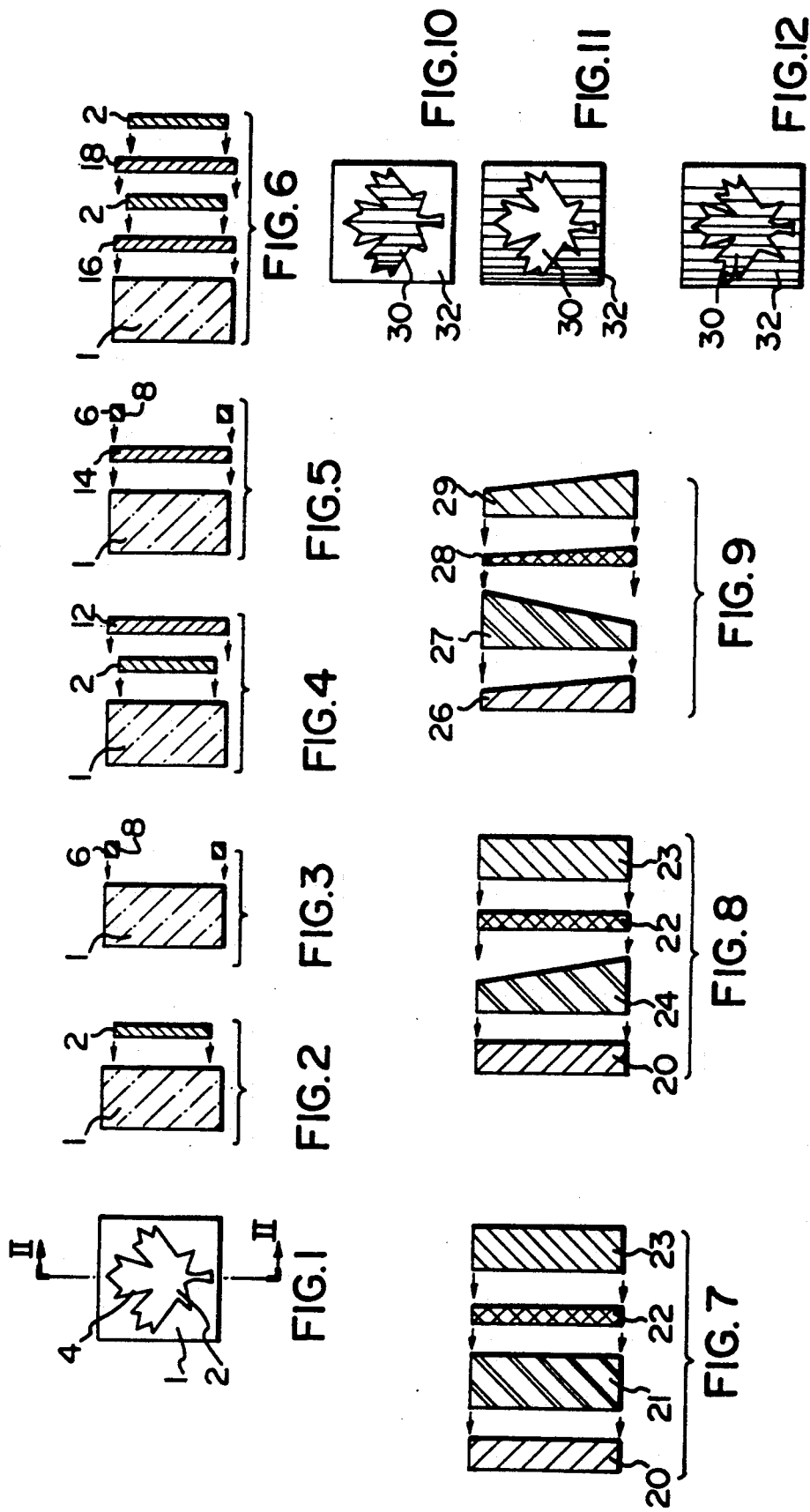

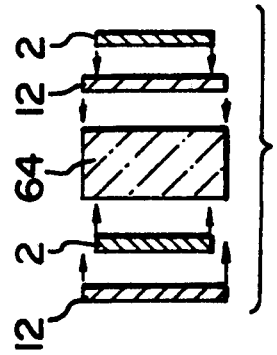
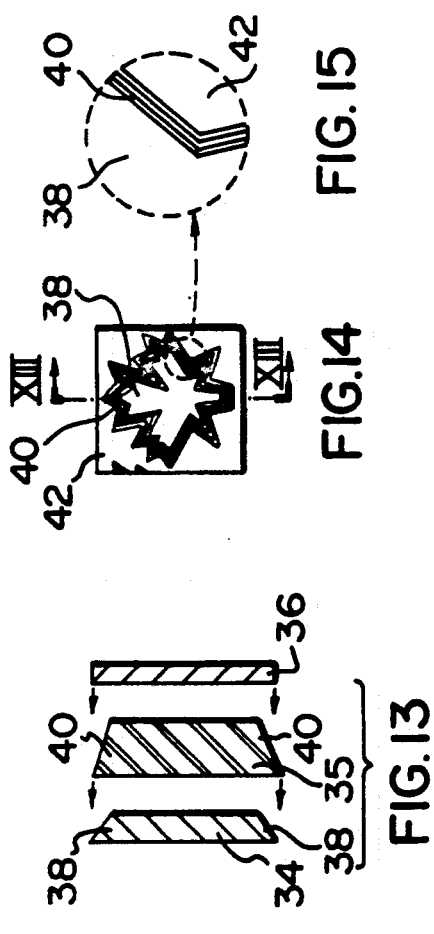
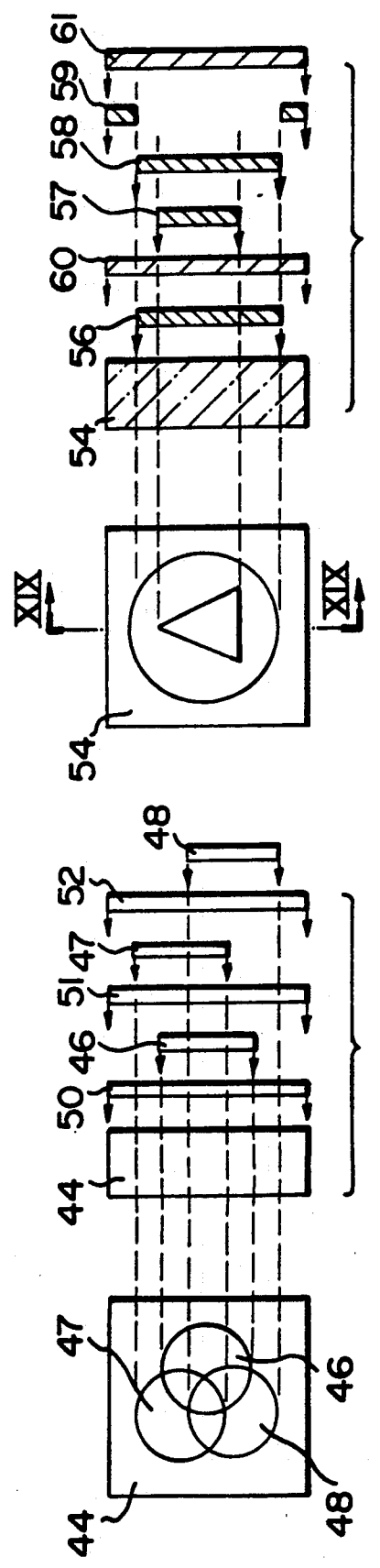

FORM DEPICTING, OPTICAL INTERFERENCE AUTHENTICATING DEVICE

This invention is a continuation-in-part application of copending application Ser. No. 06/741,562, filed June 5, 1985, which is specifically incorporated herein by reference.

This invention relates to an optical interferences authenticating device.

One optical interference authenticating means described in U.S. Pat. No. 3,858,977, dated Jan. 7, 1975, Baird et al, makes use of the fact that the reflected colour from a white light that one would actually perceive when such a filter is attached to an opaque substrate depends strongly on the colour of the surface of the substrate. For example, a free standing nine layer filter composed of alternate optical interference layers of zinc sulphide and magnesium fluoride may have a high reflectance in the red part of the spectrum, and when viewed at increasing angles of incidence the wavelength of the main reflectance peak shifts from the red through the yellow and green towards the blue part of the spectrum. But the colour that one would actually perceive when such a coating is attached to an opaque surface will depend strongly on the spectral absorption characteristics and thus colour of that surface. Since at normal incidence the filter will strongly reflect red light, light of shorter wavelengths will be transmitted by the filter and will fall on to the opaque surface. Some of the light falling on the opaque surface is reflected back by this surface and transmitted out again by the filter, and if this is substantially all of the light transmitted by the filter, then the reflected light from the surface will recombine with the reflected light from the filter to produce, what is observable by the eye as, white light once more.

If a suitable combination of optical interference coatings and surface colour and pattern of the substrate are chosen, it is possible to obtain interesting colour effects. A maximum colour contrast is obtained where the surface of the substrate is coloured black. On the other hand, no intense colour is observed where the substrate is coloured white because the white colour substantially does not absorb. Thus, a black silhouette on a white background on the substrate will only show the silhouette brightly revealed in the hue reflected by the filter.

As this effect cannot be duplicated by any paint, pigment or colour copying procedure it enables the man in the street to distinguish at a glance an authentic valuable paper bearing such optical interference layers from even the best counterfeit lacking this authenticating device.

U.S. Pat. No. 4,186,943, dated Feb. 5, 1980, P.D. Lee makes use of the optical interference authenticating coatings taught by Baird et al by incorporating them as a narrow strip of thin film running through the material of a sheet, in a manner similar to that of the well known and currently used security thread in a British banknote. The transmissivity of the sheet varies about the thin film so that at least one point where the transmissivity is relatively great the sheet constitutes a pair of superposed windows between which the thin film extends so as to be visible through each window to permit observance of the spectral reflectance and spectral transmittance characteristics.

While widespread interest has been shown in the optical interference authenticating coatings taught by Baird et al it would clearly be desirable to improve their security effectiveness by enabling the man in the street to better distinguish at a glance, for example, an authentic, valuable paper bearing such optical interference coatings from even the best counterfeit bearing an imitation of this authenticating device.

It would also be desirable to improve the security effectiveness of the optical interference coatings taught by Baird et al by making them even harder to simulate.

According to the present invention there is provided a form depicting, optical interference authenticating device, comprising a substrate and two optical interference coatings in interfacial contact and on one side of the substrate, on of the said optical interference coatings being a contrast coating, the other of the said optical interference coatings being a form depicting coating for depicting a form relative to the contrast coating, the optical interference coatings each comprising at least one optical interference layer the material and thickness of which have been selected for the coatings to have different, particular, known, spectral reflectance and spectral transmittance characteristics from one another when viewed at a particular angle, such that the form depicting coating is visible by reflected or transmitted light of particular colouration, when viewed at the said particular angle, at least in part by optical interference of light partially reflected or transmitted at the said interfacial contact.

Optical interference is defined as the variation of electromagnetic wave amplitude with distance or time, caused by the superposition of two or more light waves. These two or more waves are at least in part the result of reflection or transmission at the interfaces of thin film multilayer structures, used in the present invention, provided that the thicknesses of the individual films and layers are sufficient to support optical interference at the wavelengths of interest.

A further optical interference contrast coating may be provided, and the form depicting coating may be sandwiched between the optical interference contrast coatings.

The contrast optical interference coating may be a base, optical interference coating covering substantially the whole of the side of the substrate and is interposed between the substrate and the form depicting coating.

The contrast optical interference coating may cover substantially the whole of the side of the substrate with the form depicting coating sandwiched therebetween.

The substrate may have a mirror finish on the side that the form depicting coating is disposed.

The form depicting coating may be sen to reflect a mirror-like image when viewed at a particular angle.

At least one optical interference coating may vary in thickness.

The form depicting coating may have a marginal portion which decreases in thickness in an outward direction which will show a multi-coloured aureole around the form when the form depicting coating is viewed at a particular angle.

The form depicting coating may be one of a plurality of form depicting coatings in interfacial contact, each comprising a number of optical interference layers and each having different, known spectral reflectance and spectral transmittance characteristics at the said particular angle, and additional optical interference contrast coatings may be provided in interfacial contact, each covering substantially the whole of the substrate and being disposed between two form depicting coatings and each additional optical interference coating having different, known spectral reflectance and spectral transmittance characteristics at a particular angle.

When a plurality of form depicting coatings are provided, the form depicting coatings may partially overlie one another.

The substrate may be transparent or semi-transparent.

When the substrate is transparent or semi-transparent, a further, optical interference coating may be provided on the opposite side of the substrate to that on which the form depicting coating is disposed, the further, optical interference coating comprising at least one optical interference layer the materials and thicknesses of which have been selected to have spectral reflectance and spectral transmittance characteristics which, in combination with those of the form depicting coating, render the said distinctive form visible from at least one side of the device when the device is viewed at the said particular angle.

The substrate may be opaque but seen coloured in reflection on the side on which the form depicting coating is disposed.

It should be understood that, as far as embodiments of the present invention are concerned, when two or more form depicting or contrast optical interference coatings are provided, each having different, known, spectral reflectance and spectral transmittance characteristics, and which wholly or partially overly each other, the spectral reflectance and transmittance characteristics in the area of overlap will depend on the thicknesses and refractive indices of all the layers of all the coatings contributing to the overlap, and the particular colouration, when viewed at a particular angle, will depend at lest in part on optical interference of light partially reflected or transmitted at the interfacial contact at the overlap. Furthermore, the resulting spectral reflectance and transmittance characteristics will not, in general, correspond to those of the individual optical interference coatings.

In this specification the term refractive index will be understood to represent the complex refractive index of the material, in which the imaginary part, corresponding to the absorption coefficient, may or may not have zero value.

In this specification the term "form" includes silhouette, a geometric pattern, an ornamentation, a decoration, a logo, a number, a signature or any other embellishment that is distinct and readily distinguishable.

In the accompanying drawings which illustrate, by way of example, embodiments of the present invention, FIG. 1 is a plan view of a partially made form depicting, optical interference authenticating device for depicting a stylized maple leaf, FIGS. 2 and 3 are diagrammatic, section, exploded end views along II—II, FIG. 1 of two different embodiments of FIG. 1, FIGS. 4 to 6 are similar, sectional end views to that shown in FIG. 2 in that they are for depicting the same stylized maple leaf outline shown in FIG. 1, but which show fully made authenticating devices to that shown in FIGS. 1 and 2, FIGS. 7 to 9 show diagrammatic, sectional, exploded end views along II—II, FIG. 1 of different, optical interference coatings, FIGS. 10 to 12 are plan views of form depicting, optical interference authenticating devices having different stylized maple leaves and using the optical interference coatings shown in FIGS. 8 and 9, FIG. 13 is a diagrammatic, section, exploded end view along XIII—XIII, FIG. 14, of a different, optical interference coating to those shown in FIGS. 7 to 9, FIG. 14 is a plan view of a form depicting, optical interference authenticating device using the topical interference coating shown in FIG. 13, FIG. 15 is an enlarged, plan view of a portion of the device shown in FIG. 14, FIG. 16 is a plan view of another form depicting, optical interference authenticating device, FIG. 17 is a diagrammatic, exploded end view of the device shown in FIG. 16, FIG. 18 is a plan view of yet another form depicting, optical interference authenticating device, FIG. 19 is a diagrammatic, sectional, exploded end view along XIX—XIX, FIG. 18 and FIG. 20 is a diagrammatic, sectional, exploded end view along II—II, FIG. 1, but of a different, optical interference authenticating device.

Referring now to FIGS. 1 and 2 there is shown a partially made optical interference authenticating device comprising, a substrate 1, and a stylized leaf form depicting, optical interference coating 2 on the substrate 1, the form depicting coating 2 partially covering one side of the substrate 1 and being shaped so that a distinctive form is provided thereon which may be discerned, the form depicting coating 2 comprising at least one optical interference layer, the material and thickness of which have been selected for the form depicting coating 2 to have particular, known spectral reflectance and spectral transmittance characteristics when viewed at a particular angle, whereby the distinctive form is made visible by reflected or transmitted light of a particular colouration when viewed at a particular angle.

The substrate 1 may be a polyester film. The form depicting coating 2 has an outer boundary 4 for, as will be described later, depicting the stylized maple leaf. Thus the optical interference coating 2 covers only the portion of the surface area of the substrate 1 over which the form will be discernable. The form depicting coating 2 may comprise at least one optical interference layer selected from the group consisting of commonly used non-absorbing optical coating materials such as, for example, cryolite, $MgF_2$, $SiO$, $SiO_2$, $ThF_4$, $TiO_2$, $ZnS$ and $ZrO_2$, and absorbing materials such as, for example, Ag, Al, Au, Cu, Cr, Ge, Ni, NiCr and Si. The thickness of the or each layer of the optical interference layer will normally be within one or two orders of magnitude of 0.1 μm.

In FIG. 3, an optical interference form depicting coating 6 is provided on the substrate 1. The form depicting coating 6 has an inner boundary 8 delineating a stylized maple leaf similar to that shown in FIG. 1. Thus the form depicting coating 6 covers the portion of the surface area of the substrate 1 around the profile 4, as shown in FIG. 1.

In FIGS. 4 to 6, similar parts to those shown in any of FIGS. 1 to 3 are designated by the same reference numerals and the previous description is relied upon to describe them. In each of the FIGS. 4 to 6 the fully made device has at least one additional, optical interference, contrast coating, the materials and thicknesses of which are selected so that these coatings have different known spectral transmission and spectral reflectance to the other coatings.

In FIG. 4, the embodiment shown in FIG. 2 is provided with an optical interference, contrast coating 12 on the side of the same side of the substrate 1 as the coating 2 and completely covering the substrate 1.

As with any of the following embodiments, any contrast coating, such as optical interference, contrast coating 12, comprises at least one optical interference layer, the materials and thicknesses of which are selected so that the coating 12, in combination with the form depicting coating 2, has different, known, spectral reflectance and spectral transmittance characteristics to that portion o the coating 12 which does not overly the coating 2, due at least in part to optical interference of light partially reflected or transmitted at the interfacial contact.

If the substrate 1 is transparent or semi-transparent then the spectral reflectance or spectral transmittance characteristics of the coatings 2 and 12 may be viewed from either side. However, if the spectral reflectance characteristics of the coatings 2 and 12 are viewed through the substrate 1 then the substrate 1 may form an outer, protective covering for the coatings 2 and 12.

If the substrate 1 is substantially opaque then the spectral reflectance characteristics of the coatings 2 and 12 are viewed only from the exposed side face of the coating 12.

In FIG. 5 the embodiment shown in FIG. 3 is provided with an optical interference, contrast coating 14 between the substrate 1 and the coating 6 and completely covering the substrate 1.

If the substrate 1 is transparent or semi-transparent, and the coating 14 is transparent or semi-transparent at a particular angle, then the combined effect of the coatings 2 and 14 may be viewed through the substrate 1 in the same manner as the coatings 2 and 12 (FIG. 4). Similarly, if the substrate 1 is substantially opaque then the spectral reflectance characteristics of the coatings 2 and 14 can only be viewed from the exposed side face of the coating 14.

In FIG. 6 the substrate 1 is provided with a first optical interference contrast coating 16 then a form depicting coating 2, then a second optical interference contrast coating 18 then another, form depicting coating 2. In this embodiment, if the substrate 1 is opaque then the coating 18 and the coatings 2 are transparent or translucent at a particular angle in order that the reflectance characteristic of the coating 16 may be seen as a part of the resulting reflectance characteristic of all of the coatings 2, 16 and 18. If the substrate 1 is transparent or semi-transparent then the coatings 16 and 18 and the inner coating 2 must be transparent or semi-transparent at a particular angle if the combined reflectance characteristic of all the coatings 16 and 18 and coatings 2 is to be viewed through the substrate 1.

FIG. 7 shows a diagrammatic sectional side view of one of the coatings 2, 6, 12, 14, 16 or 18 shown in FIGS. 1 to 6, wherein all of the layers 20 to 23 are of uniform thickness and the spectral transmission and reflectance characteristics of each layer is determined by the material from which that layer is made and the thickness of that layer, and the colouration depends at least in part by optical interference of light partially reflected or transmitted at the interfacial contacts between the layers 20 to 23.

Examples of the different ways in which the embodiments shown in FIGS. 1 to 7 may function is given in the following table which illustrates, as far as the examples are concerned, what may be seen when these devices are viewed at normal incidence thereto and what may be seen when these devices are viewed at an oblique angle of incidence thereto.

In FIG. 8 similar parts to those shown in FIG. 7 are designated by the same reference numerals and the previous description is relied upon to describe them.

| Type No. | Form Depicting Coating(s) | | Device Viewed at Normal Incidence | | Device Viewed at Oblique incidence | |
|---|---|---|---|---|---|---|
| | At least one metal | At least one dielectric | Background+ | Form Depicting Coating | Background+ | Form Depicting Coating |
| 1 | | X | | Transparent or semi-transparent in same manner as background so no form seen | | Form seen coloured in transmission or reflection or in mirror-like reflection |
| 2 | | X | | Form seen coloured either in transmission or reflection | | Form seen in different colour than previously seen in transmission or reflection or in mirror-like reflection |
| 3 | | X | Transparent or *semi-transparent | Mirror-like reflection but seen opaque in transmission | Transparent or semi-transparent | Form seen coloured in transmission or reflection |
| 4 | | X | | Form seen coloured in both transmission or reflection | | Transparent or semi-transparent in same manner as background so no form seen |
| 5 | X | X | | Form seen coloured in reflection but opaque in transmission | | Form seen mirror-like or in different colour than previously seen in reflection but opaque in transmission |
| 6 | | X | | Transparent or reflected colour same as that of background so no form seen | | Form seen mirror-like or in different colour than previously seen in reflection |
| 7 | | X | | Form seen coloured in reflection in different colour to background | | Transparent or reflected colour same as background so no form seen |
| 8 | X | Y | Opaque, but coloured in reflection | Form seen in mirror-like reflection | Opaque, but coloured in reflection | Transparent or reflected colour same as background so no form seen |
| 9 | X | Y | | Form coloured in reflection in different colour to background | | Form seen mirror-like or in different colour than previously seen in reflection |
| 10 | X | Y | | Form seen coloured in reflection | | Form seen in different colour than previously seen in |

-continued

| Type No. | Form Depicting Coating(s) At least one metal | At least one dielectric | Device Viewed at Normal Incidence Background+ | Form Depicting Coating | Device Viewed at Oblique incidence Background+ | Form Depicting Coating |
|---|---|---|---|---|---|---|
| 11 | X | X | Mirror finish | Mirror-like reflection so no form seen | Mirror finish | reflection Form seen coloured in reflection |
| 12 | X | X | | Form seen coloured in reflection | | Mirror-like reflection so no form seen |

Note:
X indicates all coating(s) designated are essential
Y indicates all coating(s) designated Y may be used alone or in combination with X
*semi-transparent means transmitting light only of a particular part of the visible colour spectrum
+background is the substrate with or without at least one optical interference coating In FIG. 8 there is an optical interference coating having a layer 24 which gradually increases in thickness from one edge to another one so that the spectral reflectance and transmittance characteristics will vary from one edge to another one. This can be used to vary the spectral reflectance and transmittance characteristics across the from or the area around the form or both In FIG. 9 a more complex variation of the spectral reflectance and transmittance characteristics of an optical interference coating is obtained by all of the layers 26 to 29 gradually increasing in thickness from one edge to another one.

As shown in FIG. 10 to 12, the optical interference coatings shown in FIG. 8 or 9 may be used to vary the spectral reflectance characteristics across a stylized maple leaf form 30, the area 32 around the stylized maple leaf form 30, or both, respectively.

In FIG. 13 to 15 there is shown a form depicting, optical interference coating comprising three layers 34 to 36. The layers 34 to 35 each have marginal edge portions 38 to 40 therearound which decrease in thickness in outward directions.

As shown in FIGS. 14 and 15, the optical interference coating shown in this embodiment is used to provide a stylized maple leaf 38 with a multi-coloured aureole 40 therearound against a contrast 42 when viewed at an angle.

FIGS. 16 and 17 show a substrate 4 having form depicting, optical interference coatings 46 to 48, and optical interference, contrast coatings 50 to 52 covering the whole of the substrate 44.

As shown in FIG. 16, the form depicting coatings 46 to 48 partially overlie one another and in so doing produce a more complex geometric pattern of areas having different spectral reflectance and transmittance characteristics. It will be appreciated that the materials and thicknesses of all of the coatings 46 to 48 and 50 to 52 are chosen so that these coatings have suitable spectral reflectance and transmittance characteristics for the complex geometric pattern to be visible in reflected light or, if the substrate 44 is transparent or semi-transparent, for the complex geometric pattern to be visible in transmitted light, due at least in part to optical interference of light partially reflected or transmitted at each interfacial contact.

FIGS. 18 to 19 show a substrate 54 having form depicting, optical interference coatings 56 to 59, and optical interference coatings 60 to 61 covering the whole of the substrate 54.

As shown in FIG. 18, the form depicting coatings provide a device having very complex areas of different reflectance and transmittance characteristics.

FIG. 20 shows a transparent or semi-transparent substrate 64 sandwiched between form depicting, optical interference coatings 2 and 2, and optical interference coatings 12 and 12 which completely cover the substrate 64.

The device shown in FIG. 20 will exhibit a complex, geometric pattern by spectral transmission, due at least in part to optical interference of light partially reflected or transmitted at each interfacial contact.

The form depicting coatings can be created in a number of different ways:
1. by evaporation through suitable masks,
2. by laser excavation (see co-pending Canadian patent) application No.
3. by selective laser activated chemical vapour deposition,
4. by transfer from a substrate selectively treated with a release coating, or by other methods known to these skilled in the art.

What is claimed is:

1. An authenticating device for a document for confirming the authentication of the document, comprising:
    (a) a substrate attachable to or forming part of the document;
    (b) at least one form depicting coating carried on a first side of the substrate, said depicting coating having at least one, at least partially translucent, optical interference layer with the material and thickness thereof such as to provide first particular and known spectral reflectance and spectral transmission characteristics to the form depicting coating, said depicting coating being in a predetermined planar configuration such as to provide a design form to said depicting coating;
    (c) at least one contrast coating carried on said first side of the substrate and in interfacial contact with the depicting coating, said contrast coating where coextensive with the depicting coating having at least one, at least partially translucent, optical interference layer with the material and thickness thereof such as to provide second particular and known spectral reflectance and spectral transmission characteristics to the contrast coating, said contrast coating having a planar area greater than the planar area of the depicting coating so that only a portion of the contrast coating is in interfacial contact with the depicting coating; and
    wherein the difference in the said first and second characteristics is sufficient that when the coatings are viewed from a particular angle, the design form of the depicting coating is visible by light reflected or transmitted at lest in part by optical interference at said interfacial contact of the coatings as a different color from hat of the contrast coating which is not in interfacial contact with the depicting coating.

2. A device according to claim 1, wherein a further optical interference contrast coating is provided, and the form depicting coating is sandwiched between the optical interference contrast coatings.

3. A device according to claim 1, wherein the contrast optical interference coating is a base, optical interference coating covering substantially the whole of the side of the substrate and is interposed between the substrate and the form depicting coating.

4. A device according to claim 1, wherein the contrast optical interference coating covers substantially the whole o the side of the substrate with the form depicting coating sandwiched therebetween.

5. A device according to claim 1, wherein the substrate has a mirror finish on the side that the form depicting coating is disposed.

6. A device according to claim 1, wherein the form depicting coating is seen to reflect a mirror-like image when viewed at a particular angle.

7. A device according to claim 1, wherein at least one optical interference coating varies in thickness.

8. A device according to claim 1, wherein the form depicting coating may have a marginal portion which decreases in thickness in an outward direction which will shown a multi-coloured aureole around the form when the form depicting coating is viewed at a particular angle.

9. A device according to claim 1, wherein the form depicting coating is one of a plurality of form depicting coatings each comprising a number of optical interference layers and each having different, known spectral reflectance and spectral transmittance characteristics at the said particular angle, and additional optical interference contrast coatings are provided each covering substantially the whole of the substrate and being disposed between two form depicting coatings and each additional optical interference coating has different, known spectral reflectance and spectral transmittance characteristics at a particular angle.

10. A device according to claim 9, wherein the form depicting coatings partially overlie one another.

11. A device according to claim 1, wherein the substrate is transparent or semi-transparent.

12. A device according to claim 11, wherein a further, optical interference coating is provided on the opposite side of the substrate to that on which the form depicting coating is disposed, the further, optical interference coating comprising at least one optical interference layer the materials and thicknesses of which have ben selected to have spectral reflectance and spectral transmittance characteristics which, in combination with those of the form depicting coating, render the said distinctive form visible from at least one side of the device when the device is viewed at the said particular angle.

13. A device according to claim 1, herein the substrate is opaque but seen coloured in reflection on the side on which the form depicting coating is disposed.

* * * * *